(12) United States Patent
Proctor et al.

(10) Patent No.: US 7,991,727 B2
(45) Date of Patent: Aug. 2, 2011

(54) MECHANISM TO ABSTRACT FACT TYPES FROM A RULE ENGINE

(75) Inventors: Mark Proctor, Chiswick (GB); Edson Tirelli, São Paulo (BR)

(73) Assignee: Red Hat, Inc., Raleigh, NC (US)

( * ) Notice: Subject to any disclaimer, the term of this patent is extended or adjusted under 35 U.S.C. 154(b) by 761 days.

(21) Appl. No.: 12/072,881

(22) Filed: Feb. 27, 2008

(65) Prior Publication Data

US 2009/0216702 A1  Aug. 27, 2009

(51) Int. Cl.
*G06F 17/00* (2006.01)
*G06N 5/02* (2006.01)
(52) U.S. Cl. .............................. 706/47; 709/224; 714/30
(58) Field of Classification Search .................. None
See application file for complete search history.

(56) References Cited

U.S. PATENT DOCUMENTS

| | | | |
|---|---|---|---|
| 2003/0149677 A1* | 8/2003 | Bingham et al. | 706/45 |
| 2004/0078727 A1* | 4/2004 | Little et al. | 714/48 |
| 2006/0026576 A1* | 2/2006 | Baisley et al. | 717/143 |

* cited by examiner

*Primary Examiner* — Jeffrey A Gaffin
*Assistant Examiner* — Kalpana Bharadwaj
(74) *Attorney, Agent, or Firm* — Lowenstein Sandler PC

(57) ABSTRACT

Some embodiments of a fact type abstraction mechanism of a rule engine have been presented. In one embodiment, a fact type abstraction layer is provided to a rule engine core to allow the rule engine core to access facts of multiple different types. Further, the rule engine core is used to process the facts of multiple different types against a predetermined set of rules without converting the facts of multiple different types into a native type.

18 Claims, 6 Drawing Sheets

MECHANISM TO ABSTRACT FACT TYPES FROM A RULE ENGINE

TECHNICAL FIELD

Embodiments of the present invention relate to artificial intelligence, and more specifically to rule engines.

BACKGROUND

The development and application of rule engines is one branch of Artificial Intelligence (A.I.), which is a very broad research area that focuses on "making computers think like people." Broadly speaking, a rule engine processes information by applying rules to data objects (also known as facts). A rule is a logical construct for describing the operations, definitions, conditions, and/or constraints that apply to some predetermined data to achieve a goal. Various types of rule engines have been developed to evaluate and process rules. Conventionally, a rule engine implements a network to process rules and data objects (also referred to as facts), such as a Rete network. A network may include many different types of nodes, including, for example, object-type nodes, alpha nodes, left-input-adapter nodes, eval nodes, join nodes, not nodes, and terminal nodes, etc.

In general, the Rete algorithm describes a way to organize and reason efficiently over facts. The Rete algorithm further allows a conventional rule engine to generate conclusions and trigger actions on the facts according to the rules. Although the Rete algorithm is efficient, the Rete algorithm requires the fact to be defined and available to the conventional rule engine in a pre-defined structure because the conventional rule engine typically supports only a single type or a few types of facts. Thus, the supported type of facts may be herein referred to as the native type of facts of the rule engine. In other words, the use of the rule engine is limited by the requirement that the data of all facts is to be copied into the predefined structure before the rule engine can reason over the data. Moreover, the reverse operation is also required to journalize the results of the reasoning process of the conventional rule engine.

As more and more applications of the rule engine are developed, support of other different types of facts is desired. However, applying the conventional technique above to process facts of different types is cumbersome, and the conventional technique significantly reduces the efficiency of the rule engine as the number of different types of facts increases.

BRIEF DESCRIPTION OF THE DRAWINGS

The present invention is illustrated by way of example, and not by way of limitation, in the figures of the accompanying drawings and in which.

DETAILED DESCRIPTION

Figure 1:
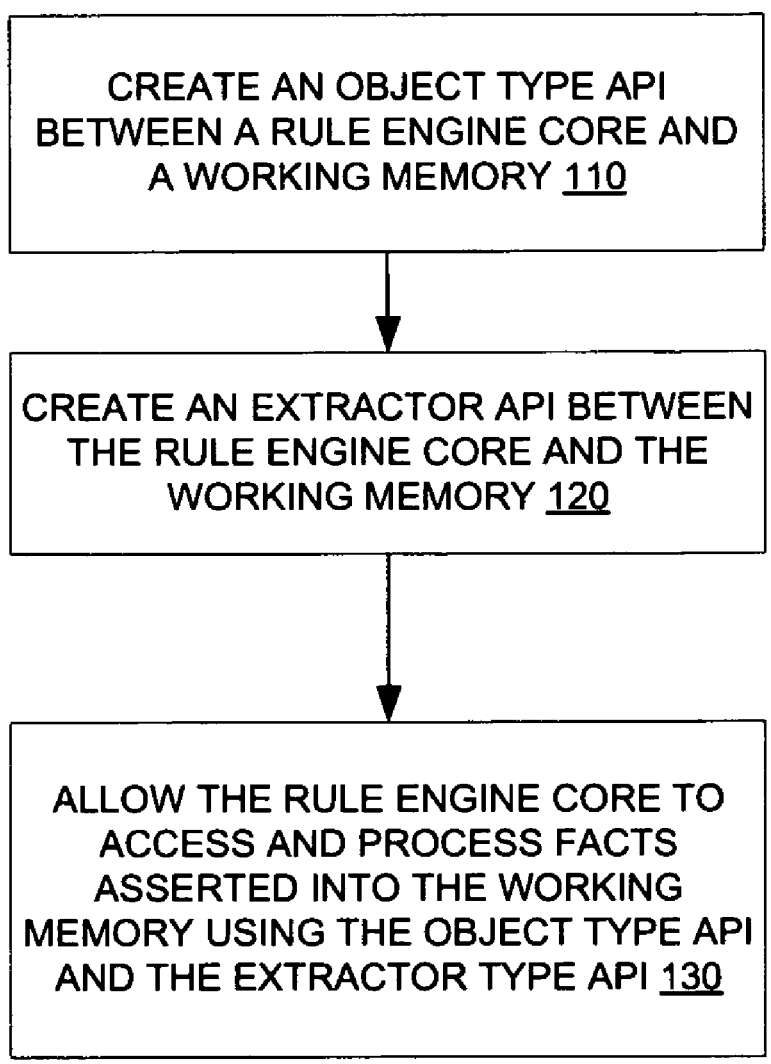
FIG. 1 illustrates one embodiment of a method to provide a mechanism to abstract fact types from a rule engine.

Described herein are some embodiments of a mechanism to abstract fact types from a rule engine. Broadly speaking, abstraction of fact types from a rule engine refers to making the types of facts asserted into a working memory of the rule engine transparent to the rule engine core according to some embodiments. Specifically, a fact type abstraction layer defines a standard way for the rule engine core to interact with facts independent of the actual type of the facts. The fact type abstraction layer allows the rule engine core to access facts of multiple different types without converting the facts into a native type. Further, the rule engine core evaluates rules against the facts of multiple different types via the fact type abstraction layer. More details of some embodiments of the rule engine and fact type abstraction are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates one embodiment of a method to provide a mechanism to abstract fact types from a rule engine. The rule engine includes a rule engine core that supports only a predetermined number of types of facts. Thus, the supported types of facts may also be referred to as the "native-types" of facts of the rule engine. The method may be performed by processing logic that may comprise hardware (e.g., circuitry, dedicated logic, programmable logic, microcode, etc.), software (such as instructions run on a processing device), firmware, or a combination thereof. For example, the computer system 700 in FIG. 7 may perform at least part of the method in some embodiments.

Referring to FIG. 1, processing logic creates an object type application programming interface (API) between the rule engine core and a working memory of the rule engine (processing block 110). The object type API allows for different implementations to support different types of facts. Some examples of the different types of facts include plain text, Extended Markup Language (XML) documents, database tables, Plain Old Java Objects (POJOs), predefined templates, comma separated value (CSV) records, custom log entries, Java Message Service (JMS) messages, etc. One important feature of object type implementation is the ability to recognize when a given fact matches a pattern declaration. For instance, a user may define a pattern as follows:
Customer(category=="VIP")
Then an exemplary object type implementation is capable of identifying which facts match the pattern declaration "Customer."

In addition to the object type API, processing logic creates an extractor API between the rule engine core and the working memory (processing block 120). While the object type API allows different types of facts to be supported by the rule engine core, the extractor API allows the rule engine core to reason over the data of these fact types. In some embodiments, the extractor API provides a standard way for the rule engine core to access fact attributes so that the rule engine does not have to define how an attribute of the facts is accessed. For instance, processing logic defines an "Extractor" interface as well as a related "ExtractorFactory" interface. To support a fact type, a set of classes implementing both the ExtractorFactory interface and the Extractor interface is provided as a rule engine plugin. For example, if the fact is a POJO fact, the implemented ExtractorFactory builds and provides an Extractor instance capable of reading the attribute of the POJO fact. Likewise, if the fact is an XML document, the implemented ExtractorFactory builds and provides an Extractor instance capable of reading the attribute of the XML document.

Then processing logic allows the rule engine core to access and process facts asserted into the working memory by using the Object Type API and the Extractor API, without any fact type conversion (processing block 130). At runtime, all the interactions between the rule engine core and the facts are made through the instances of both the object type API and the extractor API such that the rule engine core may reason transparently over different types of facts, without any substantial impact on application code or rule declarations. More details on how one embodiment of a rule engine core processes different types of facts are discussed below.

Figure 2:
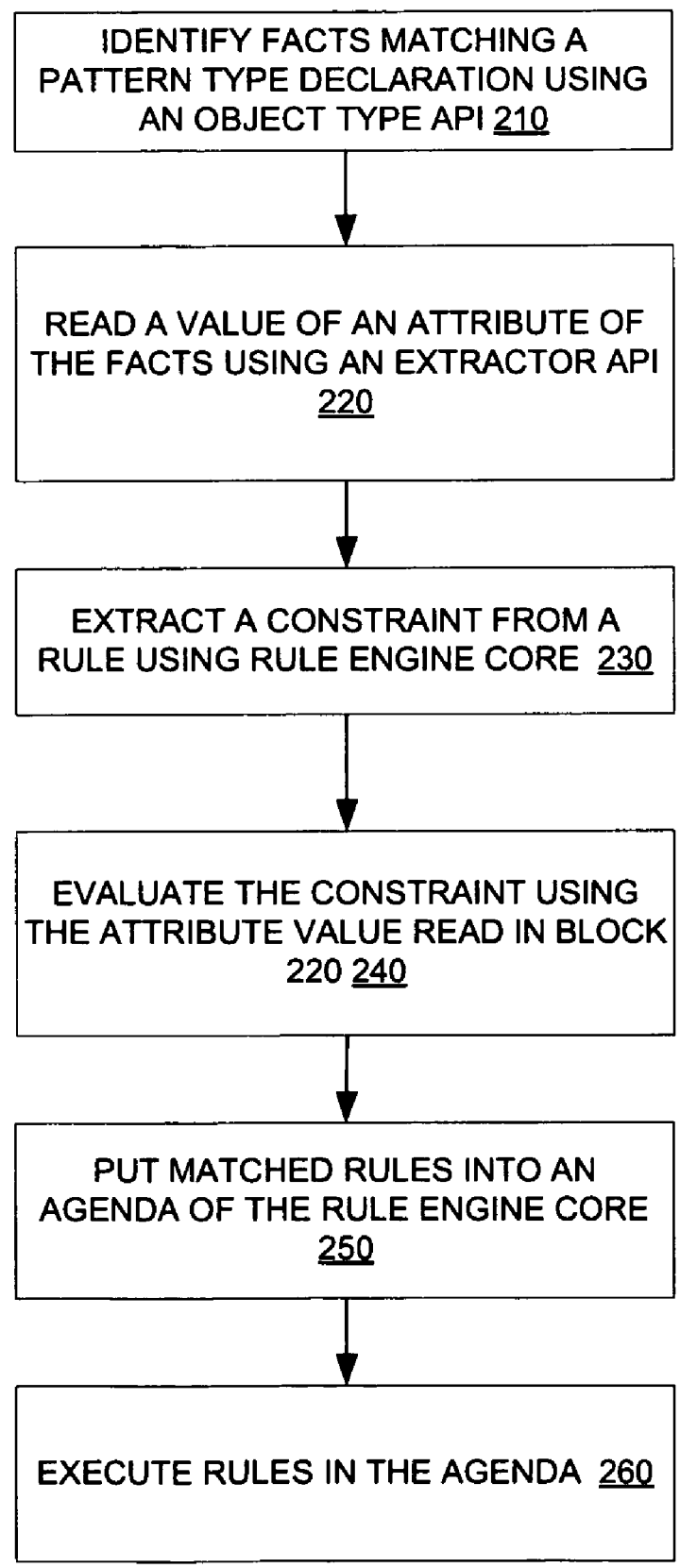
FIG. 2 illustrates one embodiment of a method to evaluate facts using a rule engine with a fact type abstraction mechanism.

FIG. 2 illustrates one embodiment of a method to evaluate facts using a rule engine with a fact type abstraction mechanism. The method may be performed by processing logic that may comprise hardware (e.g., circuitry, dedicated logic, programmable logic, microcode, etc.), software (such as instructions run on a processing device), firmware, or a combination thereof. For example, the computer system 700 in FIG. 7 may perform at least part of the method in some embodiments.

Referring to FIG. 2, processing logic identifies facts matching a pattern declaration using an object type API (processing block 210). Then processing logic reads a value of an attribute of the facts using an extractor API (processing block 220). Details of some embodiments of the object type API and the extractor API have been discussed above.

In some embodiments, processing logic extracts the constraints declared in each rule of a rule set using the rule engine core (processing block 230). Processing logic further evaluates the constraints using the values of the attributes read from the facts by using the Extractor API (processing block 240). When there is a match, the matched rule and fact pair is placed into an agenda of the rule engine core (processing block 250). Finally, processing logic executes the matched rules in the agenda (processing block 260).

The rule set may include business rules pertaining to a specific application (e.g., mortgage application, travel service, health management, etc.). For example, suppose the user has written a rule to provide automatic upgrade of cruise ship room to all "VIP" customers, then the rule engine core may extract the literal constraint 'category=="VIP"' from the rule. Then the rule engine core may evaluate the constraint by comparing the value of the category attribute of each Customer fact against the constant string, "VIP." For instance, if a Customer fact, John_Smith, has a category attribute equal to "VIP," then there is match. Therefore, the Customer, John_Smith, is provided with an upgrade of cruise ship room automatically when the matched rule in the agenda is executed.

Figure 3:
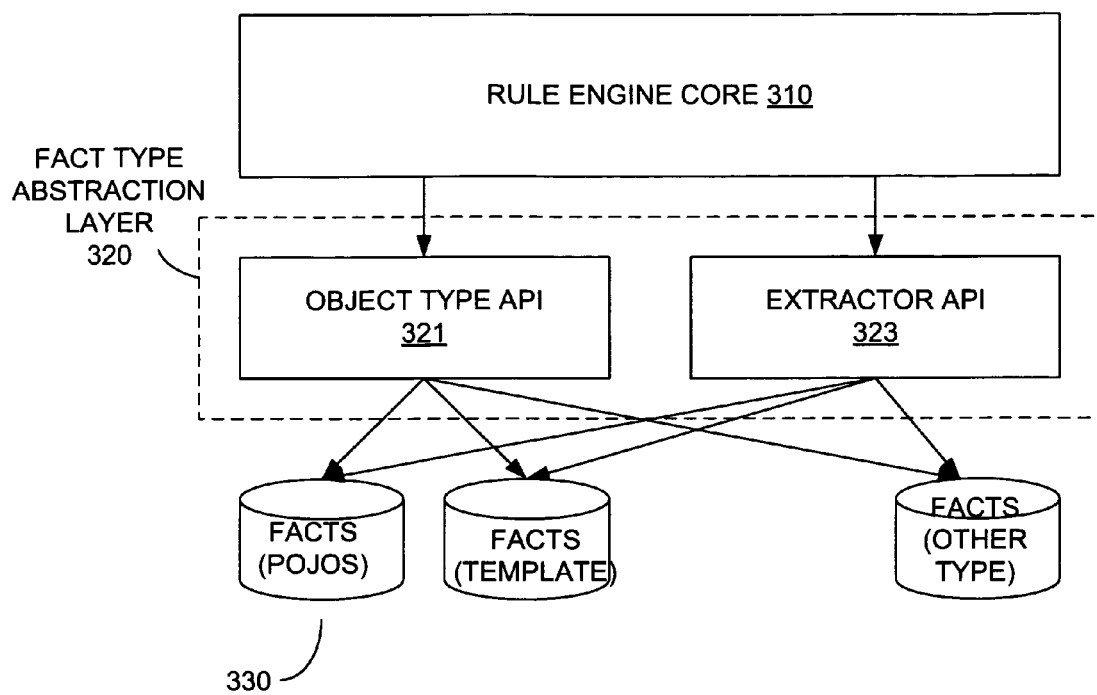
FIG. 3 shows a block diagram of one embodiment of the architecture of a rule engine.

FIG. 3 shows a block diagram of one embodiment of the architecture of a rule engine. The architecture 300 includes a rule engine core 310 and a fact type abstraction layer 320. In some embodiments, the fact type abstraction layer 320 further includes an object type API 321 and an extractor API 323. The rule engine core 310 may process different types of facts 330 in some applications, such as XML documents, database tables, predefined templates, etc. To allow the rule engine core 310 to process different types of facts, the object type API 321 recognizes which of the facts 330 match a predefined pattern declaration. Then the extractor API 323 provides a standard way for the rule engine core 310 to access the attributes of the matched facts relevant to the rules being processed. Referring back to the above example, where the "category" attribute is relevant to the rule being processed, an instance of the extractor API 323 is built and provided to read the relevant attribute of facts. For example, an instance of the extractor API 323 capable of reading XML documents is built and provided to read the "category" attribute of the XML documents.

Using the above technique, a rule engine core may process different types of facts without converting them. In other words, the rule engine does not have to copy data from different types of facts into a predefined structure or template before the rule engine can evaluate and reason over the data against rules. The above architecture also provides the benefit of allowing different access methods to be used to access the same type of fact attributes so that the rule engine may choose to use the one that offers the best benefits on a case-by-case basis. For instance, to access attributes of regular POJOs, the rule engine may decide to use bytecode generated extractors for attributes that are frequently accessed, while using reflection to access attributes that are rarely accessed. This is because reflection may be more efficient at lower access rates.

Figure 4:
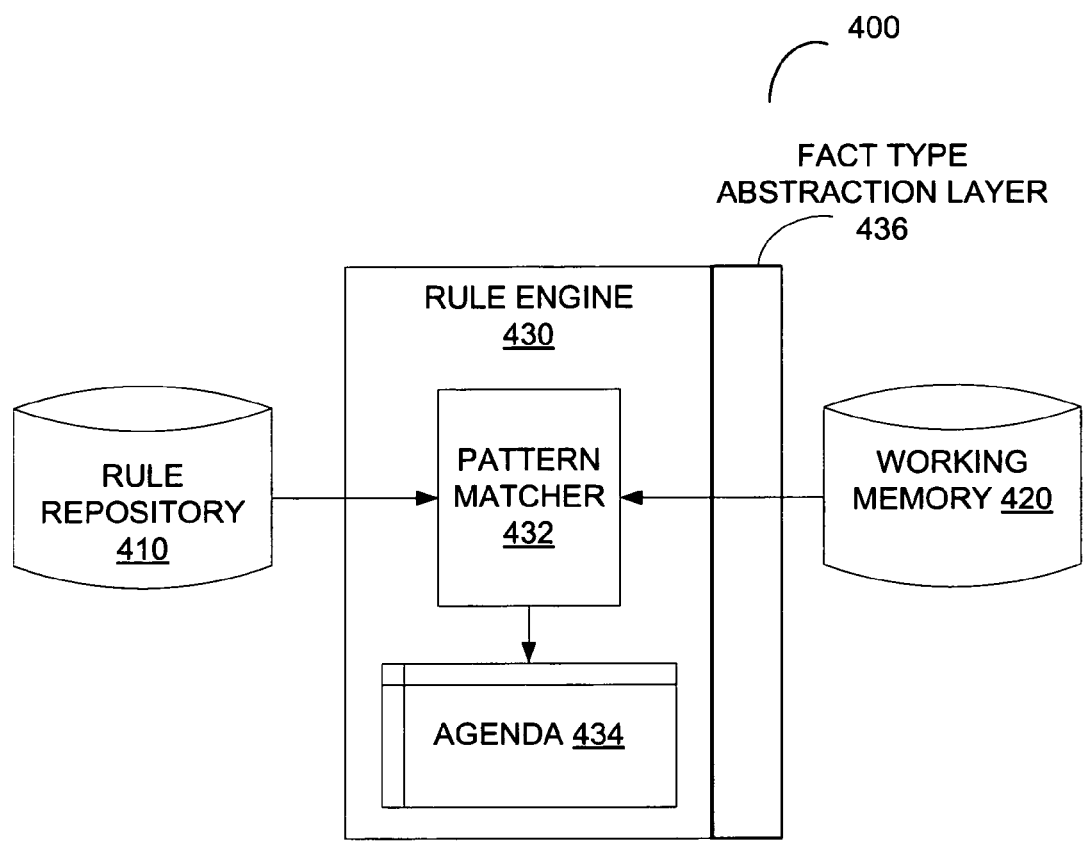
FIG. 4 shows one embodiment of a rule engine with one embodiment of fact type abstraction mechanism.

FIG. 4 shows one embodiment of a rule engine with one embodiment of a fact type abstraction mechanism. In some embodiments, a rule engine 430 is operatively coupled to a rule repository 410 and a working memory 420. The rule repository 410 stores a rule set having a number of rules. The rule repository 410 may also be referred to as a production memory. The working memory 420 stores facts (also referred to as data objects) that have been asserted.

In some embodiments, the rule engine 430 includes a fact type abstraction layer 436, a pattern matcher 432, and an agenda 434. The pattern matcher 432 generates a network (such as a Rete network) to evaluate the rules from the rule repository 410 against the facts from the working memory 420. The fact type abstraction layer 436 provides a mechanism to abstract fact types away from the rule engine 430 without converting different types of facts into a native type. Details of some embodiments of the fact type abstraction layer 436 have been described above.

Figure 5:
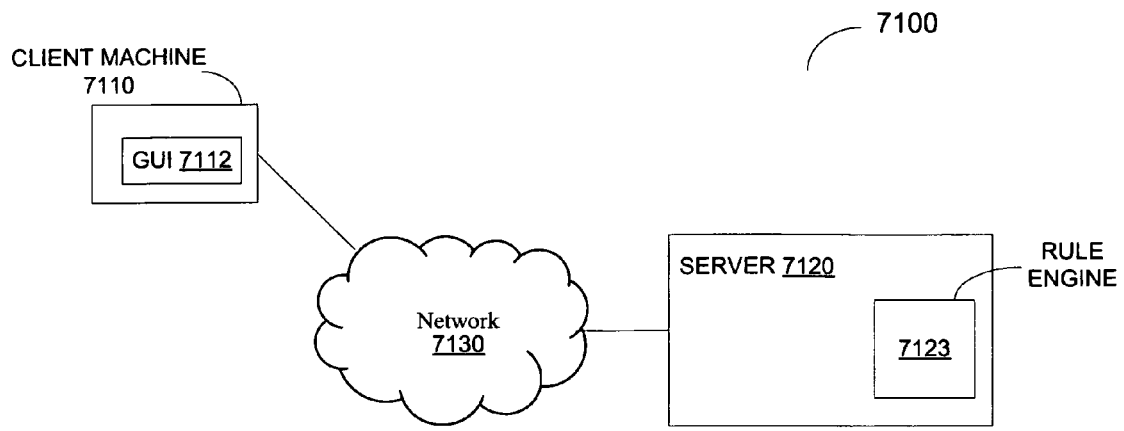
FIG. 5 shows one embodiment of a system usable with some embodiments of the present invention.

FIG. 5 illustrates one embodiment of a system usable with some embodiments of the present invention. The system 7100 includes a client machine 7110 and a server 7120, which are coupled to each other via a network 7130. The client machine 7110 may include a computing machine, such as a desktop personal computer (PC), a laptop PC, a personal digital assistant (PDA), a mobile telephone, etc. The network 7130 coupling the client machine 7110 to the server 7120 may include various kinds of networks, such as an intranet, the Internet, etc. The server 7120 may be implemented using the computer system 700 as illustrated in FIG. 7.

In some embodiments, the server 7120 includes a rule engine 7123 having an architecture as illustrated in FIG. 4. The client machine 7110 may present a GUI 7112 (e.g., a webpage rendered by a browser) to allow users to input rule sets and/or data objects, which may be sent to the server 7120 to be processed using the rule engine 7123 as discussed above.

Figure 6:
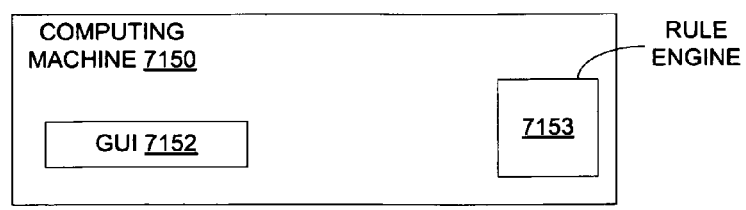
FIG. 6 shows an alternate embodiment of a system usable with some embodiments of the present invention.

FIG. 6 illustrates an alternate embodiment of a system usable with some embodiments of the present invention. The system 7200 includes a computing machine 7150, which may be implemented using the computer system 700 illustrated in FIG. 7. The computing machine 7150 includes a rule engine 7153 and a GUI 7152. In some embodiments, users may input files for rules using the GUI 7152. Then the files may be processed by rule engine 7153 as discussed above.

Figure 7:
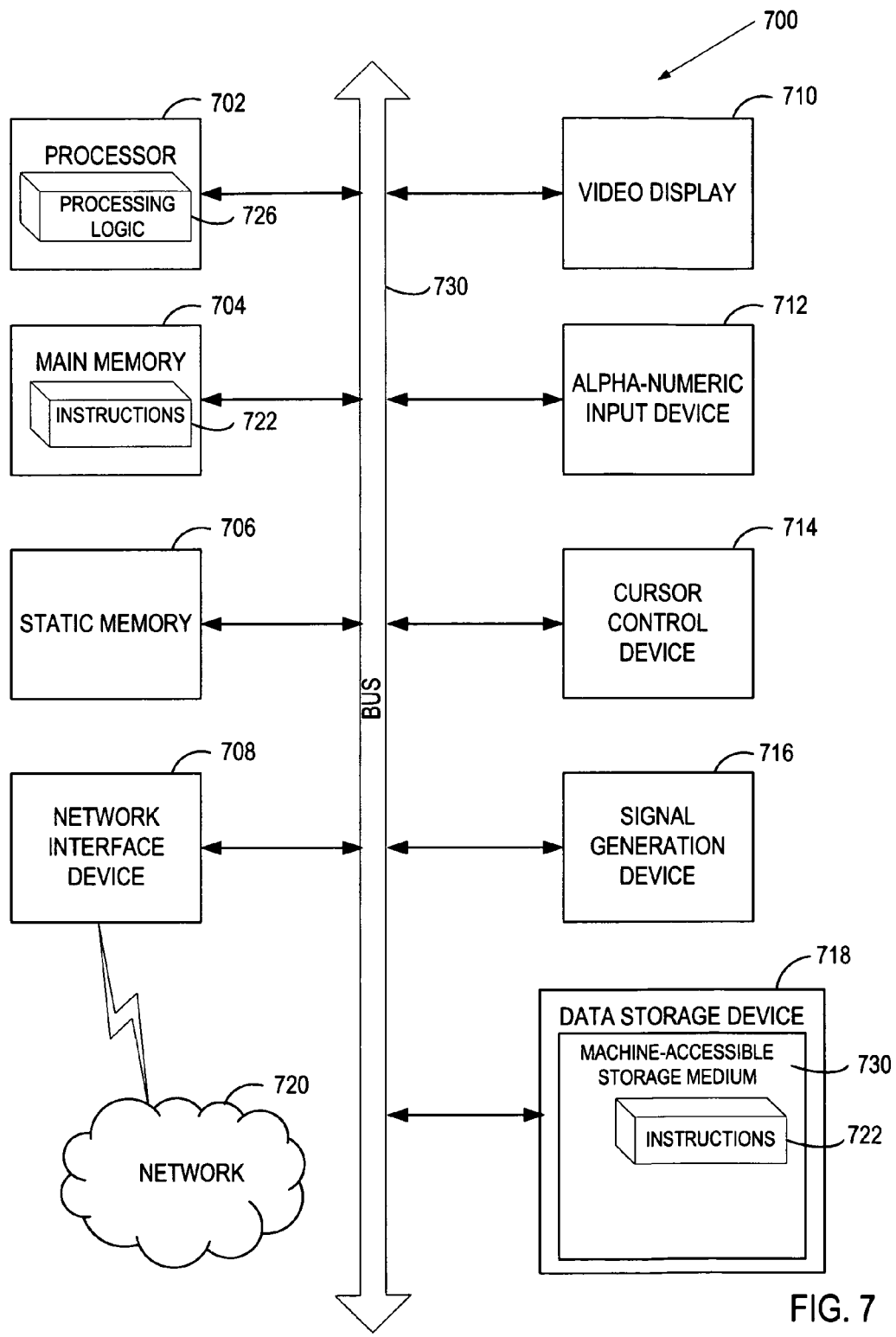
FIG. 7 illustrates a block diagram of an exemplary computer system.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a laptop PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute the processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-accessible storage medium 730 (also known as a computer-readable storage medium) on which is stored one or more sets of instructions (e.g., software 722) embodying any one or more of the methodologies or functions described herein. The software 722 may also reside, completely or at least partially, within the main memory 704 and/or within the processing device 702 during execution thereof by the computer system 700, the main memory 704 and the processing device 702 also constituting machine-accessible storage media. The software 722 may further be transmitted or received over a network 720 via the network interface device 708.

While the machine-accessible storage medium 730 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, optical and magnetic media, etc.

Thus, some embodiments of a mechanism to abstract fact types from a rule engine have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
providing a fact type abstraction layer to a rule engine core to allow the rule engine core to access facts of multiple different types; and
using the rule engine core to process the facts of multiple different types against a predetermined set of rules without converting the facts of multiple different types into a native type, wherein providing the fact type abstraction layer to the rule engine core comprises:
providing an object type application programming interface (API) between a working memory and the rule engine core, to identify a set of facts in the working memory matching a predetermined pattern declaration, the set of facts being of an arbitrary type, and
providing an extractor API between the rule engine core and the working memory to allow the rule engine core to access an attribute corresponding to the predetermined pattern declaration of each of the set of facts without converting the set of facts into the native type such that interactions between the rule engine core and the set of facts are made through instances of both the object type API and the extractor API to allow the rule engine core to reason transparently over different types of facts.

2. The method of claim 1, wherein using the rule engine core to process the facts of multiple different types against a predetermined set of rules comprises:
using the rule engine core to extract constraints from each of the predetermined set of rules; and
using the rule engine core to evaluate the constraints using a value of an attribute of each of the facts of multiple different types.

3. The method of claim 1, wherein the predetermined set of rules comprises business rules.

4. The method of claim 1, wherein the facts of the multiple different types include a predefined template.

5. The method of claim 1, wherein the facts of the multiple different types include an extended markup language (XML) document.

6. The method of claim 1, wherein the facts of the multiple different types include a database table.

7. An apparatus comprising:
a working memory in a rule engine;
a rule engine core coupled to the working memory, to evaluate a predetermined set of rules against facts asserted into the working memory; and
a fact type abstraction layer coupled to the rule engine core, to allow the rule engine core to access facts of multiple different types without converting the facts of multiple different types into a native type, wherein the fact type abstraction layer comprises:
an object type application programming interface (API) to identify a set of facts in the working memory matching a predetermined pattern declaration, the set of facts being of an arbitrary type, and
an extractor API to allow the rule engine core to access an attribute corresponding to a predetermined pattern declaration of each of a set of facts in the working memory without converting the set of facts into the native type, wherein interactions between the rule engine core and the set of facts are made through instances of both the object type API and the extractor API to allow the rule engine core to reason transparently over different types of facts.

8. The apparatus of claim 7, wherein the rule engine core is operable to extract constraints from each of the predetermined set of rules and to evaluate the constraints using a value of an attribute of each of the facts of multiple different types.

9. The apparatus of claim 7, wherein the predetermined set of rules comprises business rules.

10. The apparatus of claim 7, wherein the facts of the multiple different types include a predefined template.

11. The apparatus of claim 7, wherein the facts of the multiple different types include an extended markup language (XML) document.

12. The apparatus of claim 7, wherein the facts of the multiple different types include a database table.

13. A computer-readable storage medium that provides instructions that, when executed by a processor, will cause the processor to perform operations comprising:
providing a fact type abstraction layer to a rule engine core to allow the rule engine core to access facts of multiple different types; and
using the rule engine core to process the facts of multiple different types against a predetermined set of rules without converting the facts of multiple different types into a native type, wherein providing the fact type abstraction layer to the rule engine core comprises:
providing an object type application programming interface (API) between a working memory and the rule engine core, to identify a set of facts in the working memory matching a predetermined pattern declaration, the set of facts being of an arbitrary type, and
providing an extractor API between the rule engine core and the working memory to allow the rule engine core to access an attribute corresponding to the redetermined pattern declaration of each of the set of facts without converting the set of facts into the native type such that interactions between the rule engine core and the set of facts are made through instances of both the object type API and the extractor API to allow the rule engine core to reason transparently over different types of facts.

14. The computer-readable storage medium of claim 13, wherein using the rule engine core to process the facts of multiple different types against a predetermined set of rules comprises:
using the rule engine core to extract constraints from each of the predetermined set of rules; and
using the rule engine core to evaluate the constraints using a value of an attribute of each of the facts of multiple different types.

15. The computer-readable storage medium of claim 13, wherein the predetermined set of rules comprises business rules.

16. The computer-readable storage medium of claim 13, wherein the facts of the multiple different types include a predefined template.

17. The computer-readable storage medium of claim 13, wherein the facts of the multiple different types include an extended markup language (XML) document.

18. The computer-readable storage medium of claim 13, wherein the facts of the multiple different types include a database table.

* * * * *